United States Patent
Ho et al.

(10) Patent No.: US 7,552,353 B2
(45) Date of Patent: Jun. 23, 2009

(54) CONTROLLING CIRCUIT FOR AUTOMATICALLY ADJUSTING CLOCK FREQUENCY OF A CENTRAL PROCESSING UNIT

(75) Inventors: Duen-Yi Ho, Tu-Cheng (TW); Shou-Kuo Hsu, Tu-Cheng (TW); Chun-Jen Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 333 days.

(21) Appl. No.: 11/309,533

(22) Filed: Aug. 18, 2006

(65) Prior Publication Data

US 2007/0076498 A1 Apr. 5, 2007

(30) Foreign Application Priority Data

Sep. 2, 2005 (CN) .......................... 2005 1 0037032

(51) Int. Cl.
*G06F 1/04* (2006.01)
(52) U.S. Cl. ..................... 713/600; 713/300; 713/330; 327/544
(58) Field of Classification Search ................ 713/300, 713/330, 600; 327/544
See application file for complete search history.

(56) References Cited

U.S. PATENT DOCUMENTS

| | | | |
|---|---|---|---|
| 5,774,704 A | 6/1998 | Williams | |
| 7,203,856 B2 * | 4/2007 | Yeh | 713/322 |
| 2002/0093311 A1 * | 7/2002 | Stryker et al. | 320/135 |
| 2003/0188210 A1 * | 10/2003 | Nakazato | 713/320 |
| 2004/0003301 A1 * | 1/2004 | Nguyen | 713/300 |
| 2004/0036526 A1 * | 2/2004 | Lee | 327/544 |
| 2004/0070371 A1 * | 4/2004 | Chern et al. | 320/136 |
| 2006/0038546 A1 * | 2/2006 | Lin et al. | 323/284 |
| 2006/0103996 A1 * | 5/2006 | Carroll et al. | 361/90 |

FOREIGN PATENT DOCUMENTS

| | | |
|---|---|---|
| CN | 1614530 A | 5/2005 |
| CN | 1622044 A | 6/2005 |
| CN | 1725191 A | 1/2006 |

* cited by examiner

*Primary Examiner*—Thomas Lee
*Assistant Examiner*—Vincent T Tran
(74) *Attorney, Agent, or Firm*—Wei Te Chung

(57) ABSTRACT

A controlling circuit for automatically adjusting clock frequency of a CPU is provided. The controlling circuit includes: a current sensing circuit for converting a current signal of the CPU to a voltage signal; a voltage amplifying circuit for amplifying the voltage signal; a multi-stage switching circuit for converting the amplified voltage signal to switched signals; and a priority decoding circuit decoding the switched signals, the decoded switched signals being input to a clock generator of the CPU, and thereby adjusting the clock frequency of the CPU to fit different load on the CPU.

15 Claims, 3 Drawing Sheets

US 7,552,353 B2

CONTROLLING CIRCUIT FOR AUTOMATICALLY ADJUSTING CLOCK FREQUENCY OF A CENTRAL PROCESSING UNIT

FIELD OF THE INVENTION

The present invention relates to a controlling circuit for adjusting clock frequency of a central processing unit (CPU), and particularly to a controlling circuit for automatically adjusting clock frequency of a CPU according to a variation of a load on the CPU.

DESCRIPTION OF RELATED ART

Computers are being used today to perform a vide variety of tasks. A CPU in a computer is a core component integrated with necessary additional circuits onto a single chip called a microprocessor. A need of a clock frequency value of the CPU is related to a load on the CPU. When a large amount of data is being processed, e.g. a 3D game is being played, the CPU needs to run at a high frequency to ensure game performance. Therefore the clock frequency of the CPU needs to be adjusted according to a variation of the load on the CPU.

Conventionally the clock frequency of the CPU is dynamically adjusted according to a temperature of the CPU because the temperature of the CPU increases along with the increase of the load on the CPU. However, some environmental factors, e.g. temperature of chipsets around the CPU, and an airflow made by computer fans can influence the temperature as well. Furthermore, if a fan for cooling of the CPU is broken, the temperature of the CPU increases, resulting in an unwanted change of the clock frequency of the CPU, thereby increasing a risk of burning the CPU.

What is needed, therefore, is a controlling circuit for automatically adjusting clock frequency of a central processing unit (CPU) according to some other parameter rather than a temperature of the CPU.

SUMMARY OF THE INVENTION

A controlling circuit for automatically adjusting clock frequency of a CPU is provided. In a preferred embodiment, the controlling circuit includes: a current sensing circuit for converting a current signal of the CPU to a voltage signal; a voltage amplifying circuit for amplifying the voltage signal; a multi-stage switching circuit for converting the amplified voltage signal to switched signals; and a priority decoding circuit decoding the switched signals, the decoded switched signals being input to a clock generator of the CPU, and thereby adjusting the clock frequency of the CPU to fit different load on the CPU. It is of advantage that the controlling circuit automatically adjusts clock frequency of the CPU according to a variation of the load on the CPU.

Other advantages and novel features will become more apparent from the following detailed description when taken in conjunction with the accompanying drawings, in which:

DETAILED DESCRIPTION OF THE INVENTION

Figure 1:
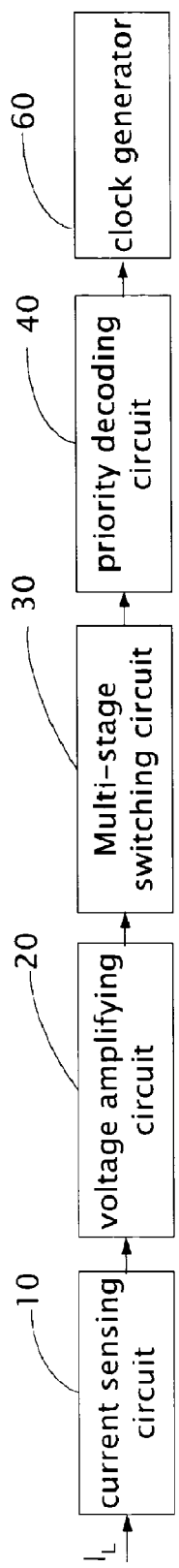
FIG. 1 is a block diagram of a controlling circuit for automatically adjusting clock frequency of a CPU, in accordance with a preferred embodiment of the present invention.

FIG. 1 shows a controlling circuit for automatically adjusting clock frequency of a CPU, in accordance with a preferred embodiment of the present invention. The controlling circuit includes a current sensing circuit 10, a voltage amplifying circuit 20, a multi-stage switching circuit 30, and a priority decoding circuit 40. Firstly, the current sensing circuit 10 connected between a power supply of the CPU and the CPU, converts a current signal $I_L$ of the CPU to a voltage signal. Secondly, the voltage amplifying circuit 20 amplifies the voltage signal. Thirdly, the multi-stage switching circuit 30 converts the amplified voltage signal to switched signals. Fourthly, the priority decoding circuit 40 decodes the switched signals. The decoded switched signals are input to a clock generator 60 of the CPU, adjusting the clock frequency of the CPU.

Figure 2:
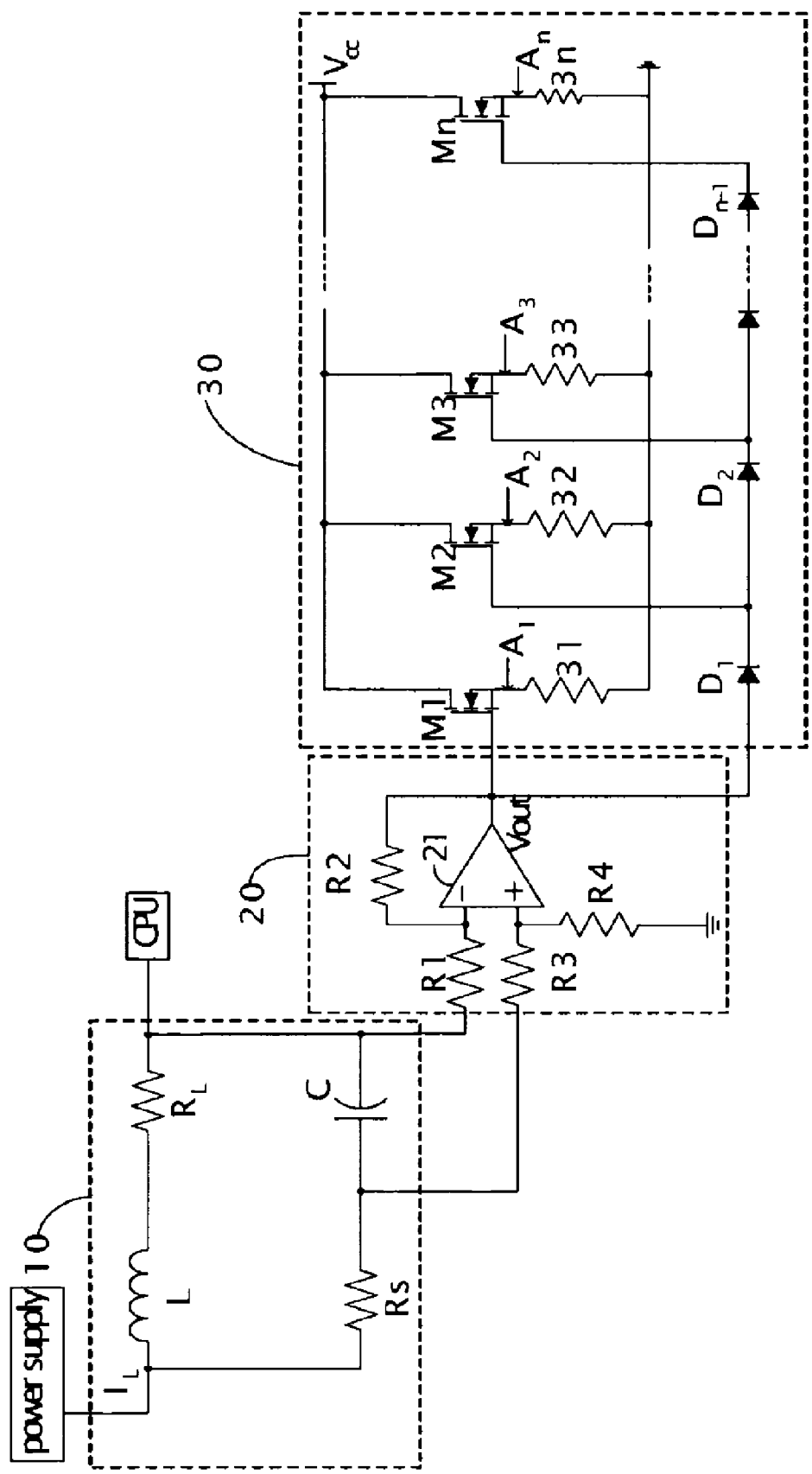
FIG. 2 is circuit diagram of a current sensing circuit, a voltage amplifying circuit, and a multi-stage switching circuit of the controlling circuit of FIG. 1.

FIG. 2 shows the current sensing circuit 10, the voltage amplifying circuit 20, and the multi-stage switching circuit 30 of the controlling circuit. The current sensing circuit 10 includes an inductor L and a resistor $R_L$ connected in series between the power supply and the CPU, and a capacitor C and a resistor $R_S$ connected in series to each other but parallel across L and $R_L$.

The voltage amplifying circuit 20 includes resistors R1, R2, R3, R4, and an amplifier 21. The amplifier 21 has an inverting input connected to a node between the capacitance C and the resistor $R_L$ via the resistor R1, and a non-inverting input connected to a node between the capacitance C and the resistor $R_S$ via the resistor R3 and also connected to ground via the resistor R4, and the resistor R2 is connected between an output of the amplifier 21 and the inverting input.

The multi-stage switching circuit 30 includes a plurality of switching circuits. The first switching circuit includes a resistor 31 and an n-channel metal-oxide semiconductor field effect transistor (N-MOSFET) M1. The N-MOSFET M1 has a gate connected to the output of the amplifier 21, a drain connected to a voltage input $V_{CC}$, and a source connected to ground via the resistor 31. The second switching circuit includes a resistor 32, a N-MOSFET M2, and a diode D1. The N-MOSFET M2 has a gate connected to a cathode of the diode D1, a drain connected to the voltage input $V_{CC}$, and a source connected to ground via the resistor 32. An anode of the diode D1 is connected to the gate of the N-MOSFET M1. The rest may be deduced by analogy: the n-stage switching circuit includes a resistor $3n$ (the n symbolizes a natural number no less than two), a N-MOSFET Mn, and a diode Dn-1. The N-MOSFET Mn has a gate connected to a cathode of the diode Dn-1, a drain connected to the voltage input $V_{CC}$, and a source connected to ground via the resistor $3n$. An anode of the diode Dn-1 is connected to the gate of the N-MOSFET Mn-1. The N-MOSFET Mn turns on, if the following equation is satisfied:

$$V_{GS}=V_G-V_S>=V_T, V_{GD}=V_{G-VD}>=V_T$$

Wherein $V_G$, $V_S$, $V_D$ (equal to $V_{CC}$), $V_T$, $V_{GS}$, $V_{GD}$ are respectively a gate voltage, a source voltage, a drain voltage, a threshold voltage, a voltage difference between the gate and the source, and a voltage difference between the gate and the drain of the N-MOSFET Mn. The gate voltage $V_G$ is found using the following equation:

$$V_G=[V_{out}-(n-1)V_p]$$

Wherein $V_p$ is a threshold voltage of the diode Dn−1, and Vout is a voltage output from the amplifier 21. The source voltage $V_S=0$ An equation is derived using the above equations:

$$V_{out} \geq (n-1)V_p + V_{CC} + V_T$$

If the above equation is satisfied, the N-MOSFET Mn turns on and the drain of the N-MOSFET Mn is at a high level. And if the above equation is not satisfied, the N-MOSFET Mn is off and the drain of the N-MOSFET Mn is at a low level. Switching signals A1, A2, . . . An are respectively a output voltage of the N-MOSFET M1, N-MOSFET M2, . . . N-MOSFET Mn.

Figure 3:
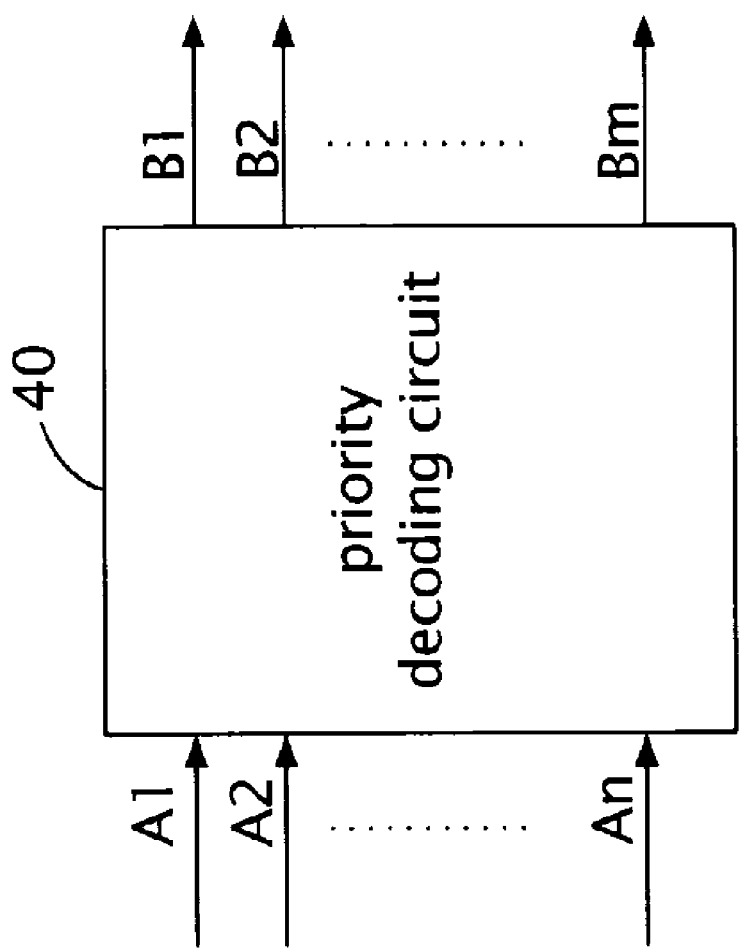
FIG. 3 is circuit diagram of a priority decoding circuit of the controlling circuit of FIG. 1.

FIG. 3 shows the priority decoding circuit 40 of the controlling circuit. The priority decoding circuit 40 converts the switched signals A1, A2, . . . An generated by the multi-stage switching circuit 30 to decoded switched signals B1, B2, . . . Bm.

As an example, if n equals 7, then the multi-stage switching circuit 30 will include a 7-stage switching circuit. The switched signals are A1, A2, A4, A5, A6, and A7. The decoded switched signals are then B1, B2, and B3. A decoding table is as table I. Wherein "1" symbolizes the high level, and "0" symbolizes the low level. If a load on the CPU increases, the current signal $I_L$ of the CPU increases. The voltage signal converted by the current sensing circuit 10 thereby increases. And the amplified voltage signal converted by the voltage amplifying circuit 20 also increases. Therefore a number of the switching circuits that are turned on increases. The corresponding decoded switched signals decoded by the priority decoding circuit 40 control the clock generator 60 generating a higher clock frequency. Also, if the load on the CPU reduces, the controlling circuit controls the clock generator 60 to generate a lower clock frequency.

TABLE I

| Switched signals | | | | | | | Decoded switched signals | | |
|---|---|---|---|---|---|---|---|---|---|
| A7 | A6 | A5 | A4 | A3 | A2 | A1 | B3 | B2 | B1 |
| 0 | 0 | 0 | 0 | 0 | 0 | 0 | 0 | 0 | 0 |
| 0 | 0 | 0 | 0 | 0 | 0 | 1 | 0 | 0 | 1 |
| 0 | 0 | 0 | 0 | 0 | 1 | 1 | 0 | 1 | 0 |
| 0 | 0 | 0 | 0 | 1 | 1 | 1 | 0 | 1 | 1 |
| 0 | 0 | 0 | 1 | 1 | 1 | 1 | 1 | 0 | 0 |
| 0 | 0 | 1 | 1 | 1 | 1 | 1 | 1 | 0 | 1 |
| 0 | 1 | 1 | 1 | 1 | 1 | 1 | 1 | 1 | 0 |
| 1 | 1 | 1 | 1 | 1 | 1 | 1 | 1 | 1 | 1 |

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A controlling circuit for automatically adjusting clock frequency of a central processing unit (CPU), the controlling circuit comprising:

a current sensing circuit for converting a current signal of the CPU to a voltage signal;

a voltage amplifying circuit for amplifying the voltage signal, and comprising an output to output an amplified voltage signal;

a multi-stage switching circuit for converting the amplified voltage signal to switched signals, the multi-stage switching circuit comprising plurality of switching circuits from a first-stage switching circuit to an Nth-stage switching circuit subsequently, the N symbolizing a natural number no less than two; each of the plurality of switching circuits comprising a resistor and a switching element, the switching element comprising a first terminal connected to a voltage input, a second terminal connected to ground via the resistor, and a control terminal for controlling on and off of the switching element wherein the control terminal of the first-stage switching circuit is connected to the ouput of the voltage amplifying circuit to receive amplified voltage signal, the control terminal of the subsequent-stage switching circuit receives a divided voltaae of the voltage received by the control terminal of the previous-stage switching circuit; the second tenninals output the switched signals; and a priority decoding circuit for decoding the switched signals, the decoded switched signals being input to a clock generator of the CPU, and thereby adjusting the clock frequency of the CPU.

2. The controlling circuit as claimed in claim 1, wherein the current sensing circuit comprises a first series circuit consisting of an inductor and a resistor connected in series, and a second series circuit consisting of a capacitor and a resistor connected in series, the first and second series circuits are connected in parallel.

3. The controlling circuit as claimed in claim 1, wherein the voltage amplifying circuit comprises an amplifier for amplifying the voltage signal.

4. The controlling circuit as claimed in claim 1, wherein the switching element of each of the switching circuits is an n-channel metal-oxide semicnductor field effect transistor (n-MOSFET), the first, second, and control terminals are the drain, source, and gate of the n-MOSFET, respectively.

5. The controlling circuit as claimed in claim 4, wherein the second-stage switching circuit further comprises a diode, the n-MOSFET of the second-stage switching circuit having the gate connected to a cathode of the diode, and an anode of the diode being connected to the output of the amplifier.

6. The controlling circuit as claimed in claim 5, wherein when N is greater than 2, the Nth-stage switching circuit further comprises a diode, a cathode of the diode is connected to the gate of the n-MOSFET of the Nth-stage switching circuit, and an anode of the diode being connected to the gate of the n-MOSFET of the (N-1)th-stage switching circuit.

7. A controlling circuit for automatically adjusting clock frequency of a microprocessor, the conirofling circuit comprising:

a current sensing circuit for converting a current signal of the microprocessor to a voltage signal;

a voltage amplifying circuit for amplifying the voltage signal;

a multi-stage switching circuit for converting the amplified voltage signal to switched signals, the multi-stage switching circuit comprising a plurality of switching circuits from a first-stage switching circuit to an Nth-stage switching circuit, the N symbolizing a natural number no less than two, the first switching circuit comprising a resistor and a switching element, the resistor and the switching element connected in series between a power source and ground, the voltage amplifying circuit outputting an amplified voltage signal to a control terminal of the switching element of the first switching circuit;

the second switching circuit comprising a resistor, a switching element, and a diode, the resistor and the switching element connected in series between a power source and ground, the amplified voltage signal from the voltage amplifying circuit be provided to a control terminal of the switching element of the second switching circuit via the diode;

the Nth-stage switching circuit comprising a resistor, a switching element, and a diode, the resistor and the switching element connected in series between a power source and ground, the amplified voltage signal from the voltage amplifying circuit be provided to a control terminal of the switching element of the Nth-stage switching circuit via (N-1) diodes connected in series; and a priority decoding circuit for decoding the switched signals, the decoded switched signals being input to a clock generator of the microprocessor, and adjusting the clock frequency of the microprocessor corresponding to the current signal of the microprocessor.

8. The controlling circuit as claimed in claim 7, wherein the current sensing circuit comprises a first series circuit consisting of an inductor and a resistor connected in series, and a second series circuit consisting of a capacitor and a resistor connected in series.

9. The controlling circuit as claimed in claim 7, wherein the voltage amplifying circuit comprises an amplifier for amplifying the voltage signal.

10. The controlling circuit as claimed in claim 7, wherein the switching element of the second switching circuit is an n-channel metal-oxide semiconductor field effect transistor (n-MOSFET), the control terminal is the gate of the n-MOSFET, the gate is connected to a cathode of the diode of the second switching circuit, a drain of the n-MOSFET is connected to the voltage input, and a source of the n-MOSFET is connected to ground via the resistor, and an anode of the diode is connected to the output of the amplifier.

11. The controlling circuit as claimed in claim 7, wherein when N is greater than 2, the switching element of the Nth-stage switching circuit is an MOSFET, the control terminal is the gate of the n-MOSFET, the gate is connected to a cathode of the diode, a drain of the n-MOSFET is connected to the voltage input, and a source of the n-MOSFET is connected to ground via the resistor, and an anode of the diode is connected to the gate of the n-MOSFET of the (N-1)th-stage switching circuit.

12. The controlling circuit as claimed in claim 7, wherein the switching element of the first switching circuit is an n-channel metal-oxide semiconductor field effect transistor (n-MOSFET), the control terminal is the gate of the n-MOSFET, the gate is connected to an output of the amplifier, a drain is connected to a voltage input, and a source is connected to ground via the resistor.

13. A controlling circuit for automatically adjusting clock frequency a microprocessor, the controlling circuit comprising:

a current sensing circuit for converting a current signal of the microprocessor which is responsive to a load on the microprocessor to a voltage signal;

a voltage amplifying circuit for amplifying the voltage signal;

a multi-stage switching circuit for converting the amplified voltage signal to switched signals, the multi-stage switching circuit comprising a plurality of switching circuits from a first switchig circuit to a Nth-stage switching circuit, and (N-1) voltage dividers, the N symbolizing a natural number no less than two, each of the plurality of switching circuits comprising a resistor and a switching element, the resistor and the switching element connected in series between a power source and ground, the plurality of voltage divider connected in series between an output terminal of the voltage amplifying circuit and a control terminal of the Nth-stage switching element, a control terminal of the switching element of the first switching circuit connected to the output terminal of the voltage amplifying circuit, control terminals of the switching elements of the subsequent switching circuits connected to nodes between the (N-1) voltage divider, respectively; and a decoding circuit for decoding the switched signals to control signals which are input to a clock generator of the microprocessor to thereby adjust the clock frequency of the microprocessor to fit the load of the microprocessor.

14. The controlling circuit as claimed in claim 13, wherein the switching element of each of the plurality of the switching circuit is an n-channel metal-oxide semiconductor field effect transistor (n-MOSFET), the control terminal is the gate of the n-MOSFET, the first switching circuit receiving the amplified voltage signal directly, and the Nth-stage switching circuit receiving the amplified voltage signal via (N-1) diodes.

15. The controlling circuit as claimed in claim 13, wherein the voltage dividem are diodes connected in series with an anode of the first diode connected to the output tenninal of the voltage amplifying circuit, and a cathode of the (N-1)th diode connected to the control terminal of the switching element of the Nth switching circuit.

* * * * *